(12) United States Patent
Hower et al.

(10) Patent No.: US 11,221,971 B2
(45) Date of Patent: Jan. 11, 2022

(54) QOS-CLASS BASED SERVICING OF REQUESTS FOR A SHARED RESOURCE

(71) Applicant: QUALCOMM Incorporated, San Diego, CA (US)

(72) Inventors: Derek Hower, Durham, NC (US); Harold Wade Cain, III, Raleigh, NC (US); Carl Alan Waldspurger, Palo Alto, CA (US)

(73) Assignee: Qualcomm Incorporated, San Diego, CA (US)

( * ) Notice: Subject to any disclaimer, the term of this patent is extended or adjusted under 35 U.S.C. 154(b) by 112 days.

(21) Appl. No.: 15/274,665

(22) Filed: Sep. 23, 2016

(65) Prior Publication Data

US 2017/0293578 A1 Oct. 12, 2017

Related U.S. Application Data

(60) Provisional application No. 62/320,379, filed on Apr. 8, 2016.

(51) Int. Cl.
*G06F 13/16* (2006.01)
*G06F 12/0811* (2016.01)
*G06F 9/54* (2006.01)

(52) U.S. Cl.
CPC .......... *G06F 13/1626* (2013.01); *G06F 9/546* (2013.01); *G06F 12/0811* (2013.01);
(Continued)

(58) Field of Classification Search
CPC .................. G06F 13/1626; G06F 13/1663
See application file for complete search history.

(56) References Cited

U.S. PATENT DOCUMENTS

| 5,745,913 A | 4/1998 | Pattin et al. |
| 7,027,462 B2 | 4/2006 | Benveniste |

(Continued)

FOREIGN PATENT DOCUMENTS

| CN | 102402490 A | 4/2012 |
| CN | 103914412 A | 7/2014 |

(Continued)

OTHER PUBLICATIONS

Nesbit K.J., et al., "Fair Queuing Memory Systems," the 39th Annual IEEE/ACM International Symposium on Microarchitecture (MICRO'06), 2006, 12 Pages.

(Continued)

*Primary Examiner* — Sanjiv Shah
*Assistant Examiner* — Alexander J Yoon
(74) *Attorney, Agent, or Firm* — Muncy, Geissler, Olds & Lowe, P.C.

(57) ABSTRACT

Systems and methods are directed to managing access to a shared memory. A request received at a memory controller, for access to the shared memory from a client of one or more clients configured to access the shared memory, is placed in at least one queue in the memory controller. A series of one or more timeout values is assigned to the request, based, at least in part on a priority associated with the client which generated the request. The priority may be fixed or based on a Quality-of-Service (QoS) class of the client. A timer is incremented while the request remains in the first queue. As the timer traverses each one of the one or more timeout values in the series, a criticality level of the request is incremented. A request with a higher criticality level may be prioritized for servicing over a request with a lower criticality level.

30 Claims, 3 Drawing Sheets

(52) U.S. Cl.
CPC .......... *G06F 13/1663* (2013.01); *G06F 13/16* (2013.01); *G06F 2212/1024* (2013.01); *G06F 2212/283* (2013.01)

(56) References Cited

U.S. PATENT DOCUMENTS

| | | | |
|---|---|---|---|
| 7,716,668 B2 | 5/2010 | Moore et al. | |
| 8,151,269 B1* | 4/2012 | Brown .............. | G06F 17/30306 707/713 |
| 8,285,914 B1* | 10/2012 | Venkatramani ..... | G06F 12/0607 711/158 |
| 8,347,295 B1* | 1/2013 | Robertson .............. | G06Q 10/06 718/103 |
| 8,584,128 B1 | 11/2013 | Don et al. | |
| 9,128,910 B1* | 9/2015 | Dayal .................. | G06F 3/0659 |
| 2005/0108719 A1* | 5/2005 | Need ....................... | G06F 9/451 718/104 |
| 2008/0077720 A1 | 3/2008 | Fanning | |
| 2009/0049256 A1 | 2/2009 | Hughes et al. | |
| 2009/0259809 A1* | 10/2009 | Hung .................. | G06F 13/1663 711/105 |
| 2010/0064072 A1* | 3/2010 | Tang ....................... | G06F 13/28 710/39 |
| 2013/0179642 A1 | 7/2013 | Plondke et al. | |
| 2013/0262761 A1* | 10/2013 | Oh ........................ | G06F 3/0659 711/114 |
| 2014/0181484 A1 | 6/2014 | Callister et al. | |
| 2014/0195743 A1* | 7/2014 | Fleischer ............ | G06F 13/1663 711/151 |
| 2015/0347189 A1 | 12/2015 | Steffen et al. | |

FOREIGN PATENT DOCUMENTS

| | | |
|---|---|---|
| GB | 2483763 A | 3/2012 |
| WO | 2013106583 A1 | 7/2013 |

OTHER PUBLICATIONS

International Search Report and Written Opinion—PCT/US2017/023185—ISA/EPO—dated Jul. 4, 2017.

* cited by examiner

QOS-CLASS BASED SERVICING OF REQUESTS FOR A SHARED RESOURCE

CROSS-REFERENCE TO RELATED APPLICATIONS

The present Application for Patent claims the benefit of Provisional Patent Application No. 62/320,379 entitled "QoS-CLASS BASED SERVICING OF REQUESTS FOR A SHARED RESOURCE" filed Apr. 8, 2016, and assigned to the assignee hereof and hereby expressly incorporated herein by reference in its entirety.

FIELD OF DISCLOSURE

Disclosed aspects are directed to resource allocation in a processing system. More specifically, exemplary aspects are directed to servicing requests to a shared resource, such as a shared memory, based on priorities related to Quality-of-Service (QoS) metrics.

BACKGROUND

Some processing systems may include shared resources, such as a shared memory, shared among various consumers, such as processing elements. With advances in technology, there is an increasing trend in the number of consumers, or "clients", that are integrated in a processing system. However, this trend also increases competition and conflict for the shared resources. It is difficult to allocate memory bandwidth of the shared memory, for example, among the various consumers, while also guaranteeing the expected Quality-of-Service (QoS) or other performance metrics for all the consumers.

In some processing systems, a memory controller may be employed for managing allocation of the memory bandwidth to the various clients. In the event of contention between multiple clients, average service time for servicing requests of the clients to the shared memory increases. In conventional implementations, the service times for each client may be increased equally or similarly, without regard to notions of priority amongst the various clients. However, in such implementations, while the increased service times may be acceptable for some clients, the increased service times may not be acceptable in the case of some high priority clients. Accordingly, there is a need in the art for improved allocation of available memory bandwidth.

SUMMARY

Exemplary aspects of the invention directed to systems and methods for managing access to a shared memory. A request received at a memory controller, for access to the shared memory from a client of one or more clients configured to access the shared memory, is placed in at least one queue in the memory controller. A series of one or more timeout values is assigned to the request, based, at least in part on a priority associated with the client which generated the request. The priority may be fixed or based on a Quality-of-Service (QoS) class of the client. A timer is incremented while the request remains in the first queue. As the timer traverses each one of the one or more timeout values in the series, a criticality level of the request is incremented. A request with a higher criticality level may be prioritized for servicing over a request with a lower criticality level.

For example, an exemplary aspect is directed to a method of managing access to a shared memory. The method comprising receiving, at a memory controller, a first request to access the shared memory from a first client of one or more clients configured to access the shared memory and placing the first request in at least a first queue in the memory controller. A series of one or more timeout values is assigned to the first request, based, at least in part on a priority associated with the first client. A timer is incremented while the first request remains in the first queue, and as the timer traverses each one of the one or more timeout values in the series, a criticality level of the first request is incremented.

Another exemplary aspect is directed to an apparatus comprising a memory controller configured to receive a first request to access a shared memory from a first client of one or more clients configured to access the shared memory. The memory controller comprises at least a first queue configured to hold the first request, and logic configured to assign a series of one or more timeout values to the first request, based, at least in part on a priority associated with the first client, increment a timer while the first request remains in the first queue, and as the timer traverses each one of the one or more timeout values in the series, increment a criticality level of the first request.

Yet another exemplary aspect is directed to an apparatus comprising means for queuing a first request to access a shared memory received from a first client of one or more clients configured to access the shared memory, means for assigning a series of one or more timeout values to the first request, based, at least in part on a priority associated with the first client, means for incrementing a time value while the first request remains in the first queue, and means for incrementing a criticality level of the first request as the time value traverses each one of the one or more timeout values in the series.

Another exemplary aspect is directed to a non-transitory computer readable storage medium comprising code, which, when executed by a processor, causes the processor to perform operations for managing access to a shared memory, the non-transitory computer readable storage medium comprising code for receiving, at a memory controller, a first request to access the shared memory from a first client of one or more clients configured to access the shared memory, code for placing the first request in at least a first queue in the memory controller, code for assigning a series of one or more timeout values to the first request, based, at least in part on a priority associated with the first client, code for incrementing a timer while the first request remains in the first queue, and code for incrementing a criticality level of the first request as the timer traverses each one of the one or more timeout values in the series.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Figure 1:
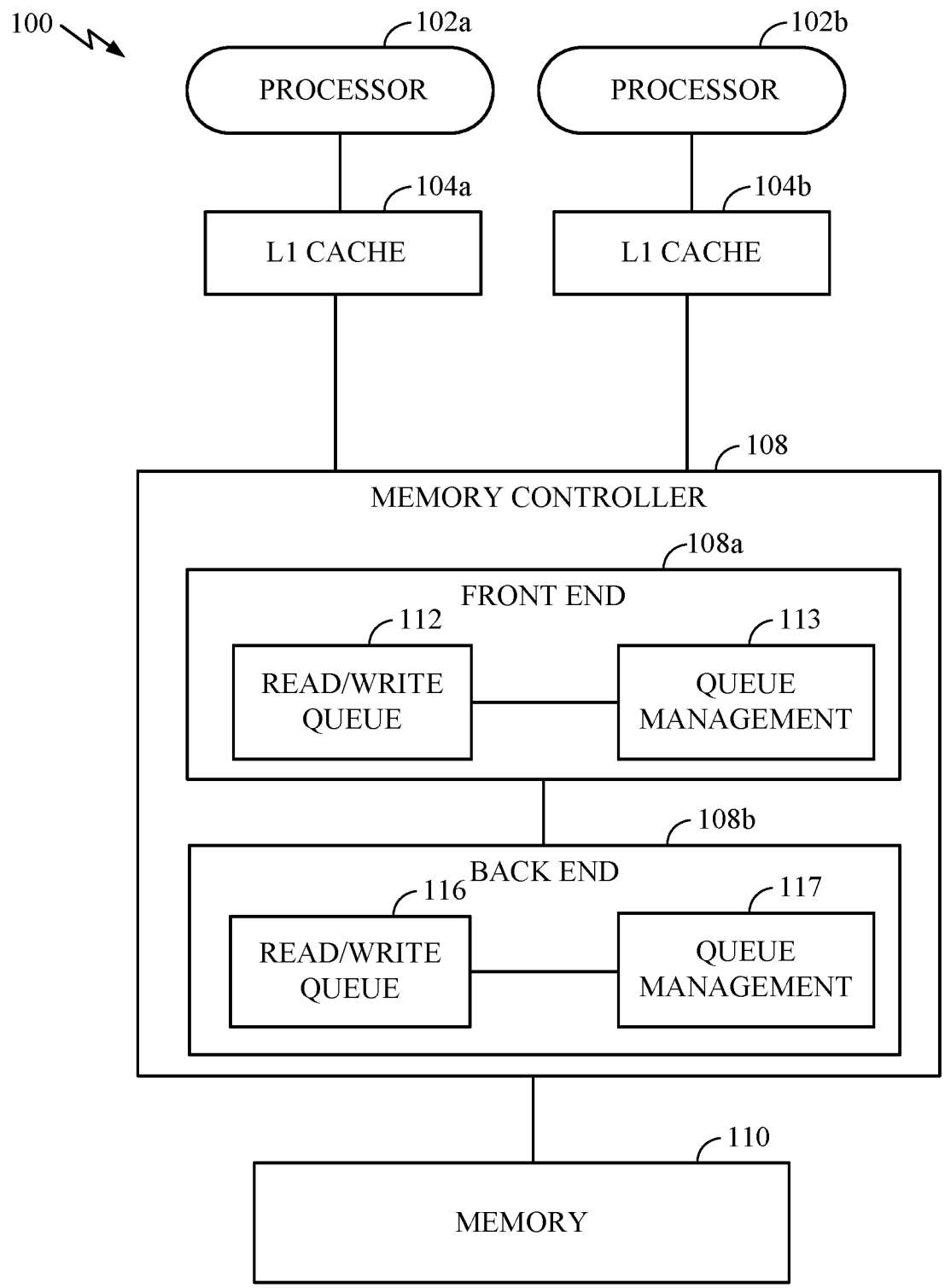
FIG. 1 depicts a block diagram of a processor system configured according to aspects of this disclosure.

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In aspects of this disclosure, shared resource allocation techniques are provided which can improve service times for some clients, such as high priority clients. This improvement, in the case of contention for the shared resources, may also be accompanied by degradation of service times for some other clients, such as lower priority clients.

In a processing system with multiple clients, each client is assigned a priority, which may be a fixed priority or a dynamic priority which may be dynamically modified. In one aspect, dynamic priority may be based on a proportional share parameter (referred to as a proportional share weight) associated with a client, wherein the proportional share parameter provides a measure of the client's priority in the processing system based on the client's proportionally allocated share of resources in the processing system. In some cases, the proportional share parameter may be based on a Quality-of-Service (QoS) class that the client belongs to, wherein each QoS class may represent one or more clients of the processing system.

When a request from a client is received at a common resource manager, such as a memory controller of a shared memory (e.g., more specifically, a front end of the memory controller which comprises queues to hold received read/write requests to the shared memory), the request is assigned one or more timeout values which may be a function of the priority associated with the client. As each of the one or more timeout values are exceeded, criticality of the request increases. Among other factors which may be considered, the more critical requests are treated with higher preference and may be serviced ahead of less critical requests. A similar notion of priority based servicing may also be followed at a backend of the memory controller which may take into account states of the shared memory in addition to the priority associated with the requests received from the frontend.

With reference to FIG. 1, processing system 100 configured according to exemplary aspects, is illustrated. Processing system 100 can include one or more processors (or specifically, processor cores), representatively shown as processors 102a-b, each with one or more possible levels of caches, of which L1 caches 104a-b corresponding to processors 102a-b, respectively are particularly illustrated. Processors 102a-b (in conjunction with one or more caches such as L1 cache 104a-b) are referred to as clients. Accordingly, multiple clients can make requests for accessing a shared memory illustrated as memory 110, wherein accesses to memory 110 may be managed by memory controller 108. In some aspects, memory 110 may be a main memory, implemented, for example, using dynamic random access memory (DRAM) technology, and more specifically, a double-data rate (DDR) memory, and in such cases, memory controller 108 may also be correspondingly referred to as a DRAM controller/scheduler or DDR controller/scheduler, etc.

Memory controller 108 may receive the requests from processors 102a-b and service the requests according to various processes discussed herein. In this regard, memory controller 108 may comprise a frontend denoted by the reference numeral 108a and a backend denoted by the reference numeral 108b. Frontend 108a may include one or more queues for receiving read and write requests from the various clients such as processors 102a-b. In the illustration shown, a combined read/write queue 112 is shown as one example where read and write requests may be stored as they are received. As such, read/write queue 112 may be a buffer such as a first-in-first-out (FIFO). Queue management block 113 comprises logic configured to manage read/write queue 112 and generally perform functions associated with assigning priorities to requests in read/write queue 112, wherein servicing the requests for accessing memory 110 may be based at least in part on these priorities. Accordingly, in one aspect, queue management block 113 may be configured to assign or associate a priority to a request received at memory controller 108 and placed in read/write queue 112. The priorities assigned may be based at least in part on the client which generated the request, wherein the priority may be a pre-specified fixed priority for the client or a dynamically modifiable priority, based for example on a QoS class that the client belongs to.

In some aspects, requests which are ready to be serviced may be transferred from read/write queue 112 to backend 108b of memory controller 108, for example, in cases where memory controller 108 is configured with separate frontend and backend processing (keeping in mind that in some cases the above-described frontend and backend processing functionalities may be merged, and in those cases, a single queue may exist for holding requests received till they are pulled out from the queue to be granted access to memory 110). In this regard, backend 108b may also include several queues, among which another combined read/write queue 116 is shown for the sake of one example. Requests which are accepted for servicing from frontend 108a are transferred to read/write queue 116 at backend 108b. Correspondingly, queue management block 117 is shown, which comprises logic to manage servicing of requests placed in read/write queue 116. Backend 108b may also comprise additional buffers such as a response block (not separately shown) which may be used to temporarily store read data returned from memory 110 and/or status messages related to access of memory 110.

Among the various access requests that are possible to memory 110, read requests (or load requests) are considered in more detail in relation to timing critical requests. This is because write requests (or store requests) comprise data to be written and so once the data has been sent, the clients making the requests may not have subsequent computations which depend on the write, and as such, may not need to wait for the write operation to be completed. Whereas, in the case of read requests, once the requests are made to memory controller 108 from the various clients, the requests are queued up for being granted access to memory 110, and serviced according to various aspects discussed below, before corresponding data is returned back to the requesting client. The requesting client, therefore, waits for the result or data corresponding to the read request once the read request has been issued. The amount of wait time between when the read request is sent and the data is returned from memory 110 is generally referred to as the latency. While some clients (or more specifically, some requests of some clients) can tolerate long latencies, some clients or specific requests of some clients may be timing-critical and therefore, long latencies may not be acceptable.

In an effort to service timing-critical requests ahead of non-timing-critical requests, memory controller 108 may implement prioritization schemes at various stages of the requests. While the following aspects may apply to both the frontend and backend, one example implementation of the different types of queue management at the frontend and the backend will now be discussed. Thus, in one example, at read/write queue 112 of frontend 108a, the prioritization schemes may take into account priorities associated with clients which generated the requests (e.g., fixed priority or dynamic priority based on a proportional share associated with a QoS class of the client). Additionally or alternatively, in one example, at read/write queue 116 at backend 108b, the prioritization schemes may also take into account characteristics or states associated with memory 110, such as pre-charged banks, open row buffers, first-ready requests, etc. which will now be explained in further detail.

Considering memory 110 in more detail, memory 110 may have multiple banks (e.g., DRAM or DDR banks, not particularly illustrated), wherein each bank comprises a memory block or array. Each read request may be serviceable by accessing a specific bank. For efficiency (e.g., in terms of latency, power consumption, etc.), it is desirable to service a request if a bank to which a request is directed to is already precharged (e.g., for servicing a different request). The prioritization of servicing requests which are ready to be serviced first, e.g., which are directed to banks which are precharged, is referred to as servicing first-ready requests in this disclosure. This may sometimes mean that a request is serviced out of order. Since memory 110 is shared among multiple clients, it is also possible that requests from different clients may be directed to the same bank, and this leads to possible contention. Resolving the contention may sometimes be in favor of a request which was received later.

There is also a notion of row buffers associated with the various banks. In simple terms, a row buffer holds data read out from a particular row of a bank before the data is returned through various interconnects or channels to a requesting client. The row buffer is typically designed to be of a larger size than that of a cache line size, so that the row buffer may be populated with data for servicing multiple cache lines before being transported on to the interconnects, which can improve efficiency in the transfer of data out of memory 110. Thus, if a row buffer is open, then it is desirable to prioritize and service any request which may be able to access a row corresponding to the row buffer. Such a request which is directed to a row for which a row buffer is open, is referred to as a "row hit" in this disclosure. In aspects of this disclosure, requests in read/write queue 116 at backend 108b which would generate a row hit may be assigned a high priority.

In exemplary aspects, a criticality level may be assigned to requests in either or both of read/write queues 112, 116, and requests may be prioritized for servicing/accessing memory 110 based on the criticality level, in the backdrop of other considerations such as states of memory 110 such as row hits, precharged or first-ready banks, etc.

When a first request, for example, is received at memory controller 108, e.g., at frontend 108a, from a first client (e.g., processors 102a-b or L1 caches 104a-b), the corresponding priority of the first client is obtained, for example, by queue management block 113. For example, the priority may be a fixed priority or a dynamic priority based on a Quality-of-Service (QoS) class of the first client, wherein, depending on QoS requirements for each client, groups of one or more clients may be classified into QoS classes. The first request itself may have an indication of the associated priority or class of the first client from which the priority can be derived from. In some examples, queue management block 113 at frontend 108a of memory controller 108 may have a database or table (not shown) for priorities or QoS classes associated with various clients, and the priority of the first request may be obtained from such a database.

When the first request is received at memory controller 108, memory controller 108 may place the request in read/write queue 112 at frontend 108a. Correspondingly, logic such as queue management block 113 may be configured to assign a series of one or more timeout values, based at least in part on the priority of the first client to the first request in read/write queue 108. Queue management block 113 may also include a timer or other means for incrementing a time value (wherein, it will be understood that "incrementing" can be in a positive or a negative direction without affecting the scope of this disclosure). For example, the timer may be incremented while the first request remains in read/write queue 108. As the timer traverses each one of the one or more timeout values in the series, a criticality level of the first request may be incremented (wherein, once again, the criticality level may be incremented in a positive or a negative direction without impacting the scope of this disclosure).

For example, when the first request is placed in read/write queue 112, the timer may start from a reset value of zero. The timer may be incremented at each clock cycle, for example, that the request remains in read/write queue 112 (e.g., without being transferred to read/write queue 116 or otherwise serviced for accessing memory 110). When the timer reaches a first timeout value of the series of one or more timeout values, a criticality level of the request is increased, say to a first level of criticality. In one implementation of traversing the timeout values in the series, the timer may be reset when the timer reaches the first timeout value and incremented again till the timer reaches the second timeout value, and so on. If the request still remains in read/write queue 112 when the timer traverses the second timeout value, the criticality level is increased to a second level of criticality, and so on. The longer the request remains in a queue such as read/write queue 112, the more timeout values are traversed and the higher the level of criticality of the request.

In some cases, the subsequent of later timeout values may be smaller or of shorter duration than earlier or preceding timeout values (e.g., the second timeout value may be shorter than the first timeout value). In this manner, the process of increasing criticality of the request may be expedited (keeping in mind that is possible for a timeout value to be zero in some cases, to immediately raise the criticality level of a request). For example, a later timeout value may be exponentially smaller than an immediately earlier timeout value, which may cause the criticality level to increase at an exponential rate while the first request remains in the queue without being serviced. It is also possible for a later timeout value in the series to be made larger than an earlier timeout value, in which case, the criticality level of the request may increase at a slower rate as the timer traverses more timeout values.

Accordingly, in some aspects, queue management block 113, for example, may be configured to prioritize, for granting access to memory 110, the first request over a second request in read/write queue 112, if the first request has a higher criticality level than the second request.

As mentioned above, the series of the one or more timeout values for the first request may be a function of priority of the first client. In the case of dynamically modifiable priority, the priority may be based, at least in part on a Quality-of-Service (QoS) class associated with the first client, denoted as QoS class C. The series of one or more timeout values may also depend on the occupancy of read/write queue 112, for example, and more specifically, the number of requests which are in the queue from the same QoS class in some cases (denoted as occupancy_c for QoS class C).

In one aspect, $\alpha_c$ denotes a programmable constant associated with a particular QoS class C. In some cases $\alpha_c$ may also be referred to as a "stride" and may be inversely proportional to a proportional share parameter associated with the class C. An example timeout value of the series of one or more timeout values associated with the request may be represented as $t=M*\alpha_c*occupancy\_c$, wherein M may be a scaling factor which may be programmable. In some cases, M may be different for each of the one or more timeout values. In some cases, there may be only one timeout value where the criticality may be a binary function, such that when the one timeout value expires, the associated request is promoted to being critical and otherwise the request remains non-critical. In some cases, the request or the request's QoS class may be used to index into a table (not shown) in queue management block 113, for example, to determine the value of $\alpha_c$ to calculate the respective timeout values.

The multiple M may be a function of the expected wait time in memory controller 108, which may be based, for example, on particular implementations or memory configurations. In an example, the multiple M may be chosen such that a class with $\alpha_c=1$ (where "1" is assumed to be the highest possible priority) becomes critical or has criticality level increased after the an associated timeout expires in a lightly loaded system (e.g., memory controller 108 does not have a relatively large number of requests queued up for servicing). It will be observed that under this scheme, all requests will eventually become critical or reach the highest levels of criticality, but the timeout values for low priority requests may be set such that their criticality levels are lower (or are achieved slower) than the requests from higher priority classes.

A similar prioritization scheme may be implemented in backend 108b of memory controller 108. More specifically, queue management block 117 may be configured to assign a series of one or more timeout values based, at least in part on priorities, to requests in read/write request queue 116, and based on the one or more timeout values, criticality levels may be similarly generated with a timer configured to be incremented and the criticality levels incremented as the timer traverses each one of the one or more timeout values in the series. In addition to the criticality level obtained based on the one or more timeout values (which may be a function of factors such as the associated QoS class, occupancy, etc.), the states of memory 110 (e.g., precharged banks, first-ready row buffers, etc.) may also be taken into account in read/write queue 116 at backend 108b. Although various options are possible, one example is discussed below for integrating the criticality levels with the states of memory 110 for servicing requests in read/write queue 116.

With respect to criticality levels, once again, a request with a higher criticality level may generally be prioritized for servicing over a request with a lower criticality level. Accordingly, since a request with a higher criticality level can be serviced ahead of a request with a lower criticality level, the service time for the request with the higher criticality level can be improved (which, in some cases can mean that the service time for the request with the lower criticality level may be degraded in comparison to a scheme which does not incorporate the exemplary notion of priority or promotion of criticality levels for some requests). When the states of memory 110 are also taken into account, one example order in which requests in read/write queue 116 may be serviced may follow the following example order, row hits, if present, may be serviced first (wherein, if there are row hits for two requests, one with a higher criticality level than the other, then the request with the higher criticality level of the two requests with row hits will be serviced first). In some aspects, however, even within a scheme of prioritizing row hits in this manner, a limit may be placed on the number of consecutive row hits which are serviced, e.g., after a pre-specified number of row hits, a request which may not have a row hit may be considered.

Following row hits, first-ready requests directed to a precharged bank of memory 110 may be considered in an exemplary prioritization scheme (one again, with criticality levels accounted for, e.g., if there are two requests which are first-ready, i.e., directed to a memory bank of memory 110 which has been precharged, one request with a higher criticality level than the other, then the request with the higher criticality level of the two requests which is first-ready will be serviced first).

In this manner, exemplary aspects of this disclosure may include prioritization schemes for servicing requests to a shared memory, based at least in part on priorities associated with clients (the priorities may further be based on a proportional share allocated to the clients based the QoS class associated with client), wherein the prioritization schemes may further take into account characteristics or states, such as row hits, first-ready precharged banks, etc., of the shared memory.

Figure 2:
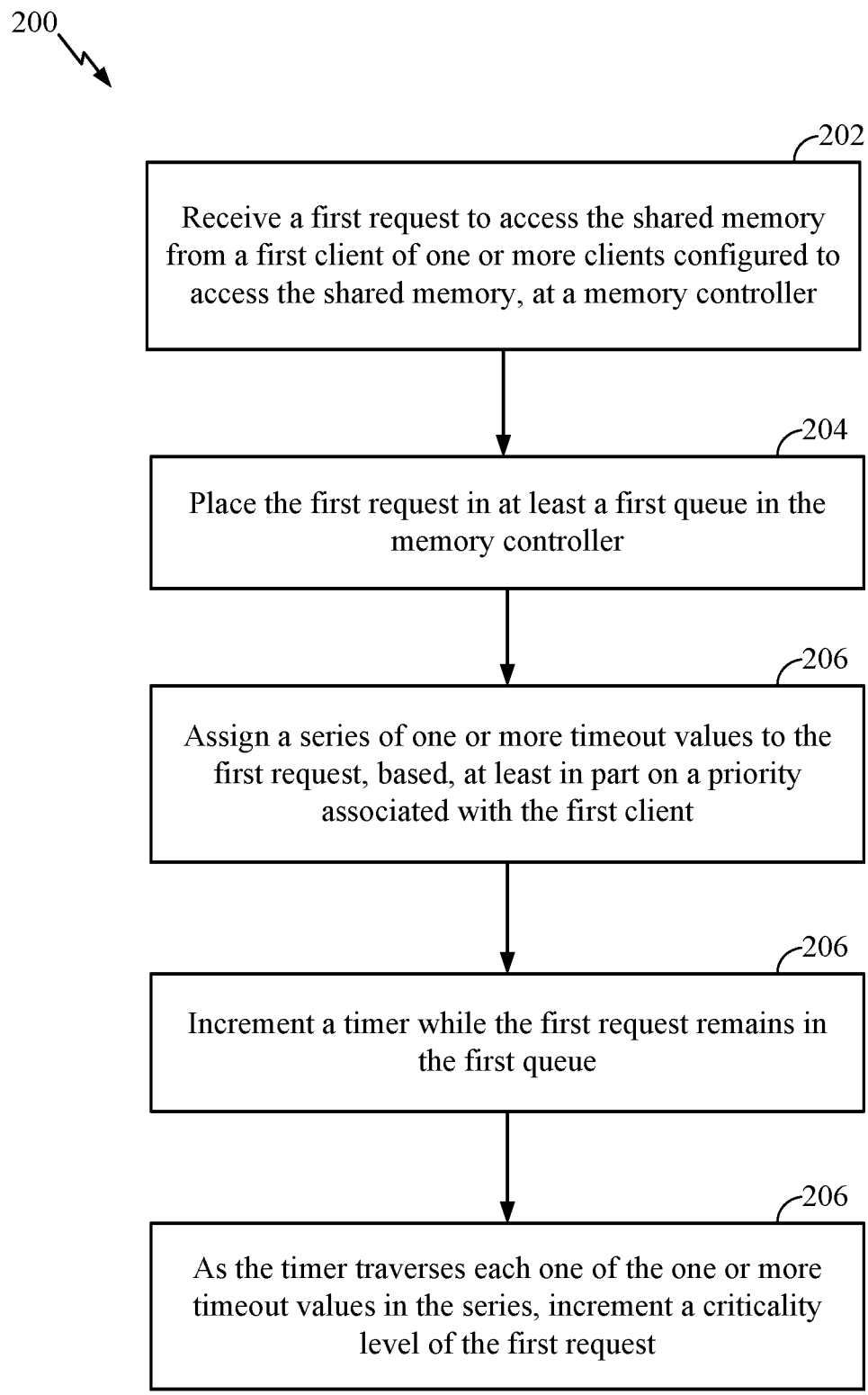
FIG. 2 depicts an exemplary method of servicing requests to a shared memory, according to aspects of this disclosure.

Accordingly, it will be appreciated that exemplary aspects include various methods for performing the processes, functions and/or algorithms disclosed herein. For example, FIG. 2 illustrates a method 200 of managing access to a shared memory.

In Block 202, method 200 comprises receiving, at a memory controller (e.g., memory controller 108), a first request to access the shared memory (e.g., memory 110) from a first client of one or more clients (e.g., processors 102a-b, L1 caches 104a-b, etc.) configured to access the shared memory.

In Block 204, the first request may be placed in at least a first queue (e.g., one of read/write queues 112, 116 depending on the particular implementation of frontend/backend management in memory controller 108) in the memory controller.

In Block 206, a series of one or more timeout values may be assigned to the first request, based, at least in part on a priority associated with the first client (e.g., queue management 113, 117 may respectively assign the series of one or more timeout values based on a fixed priority or a dynamically modifiable priority based on a proportional share associated with a QoS class of the first client).

In Block 208, a timer (e.g., in queue management 113, 117) is incremented while the first request remains in the first queue.

In Block 210, as the timer traverses each one of the one or more timeout values in the series, a criticality level of the first request is incremented. Thus, method 200 may involve in some cases, prioritizing, for granting access to memory 110 the first request over a second request in the first queue, if the first request has a higher criticality level than the second request. In various cases, prioritizing requests in the first queue may be based on other factors such as occupancy of the first queue, one or more states of the shared memory, etc.

Figure 3:
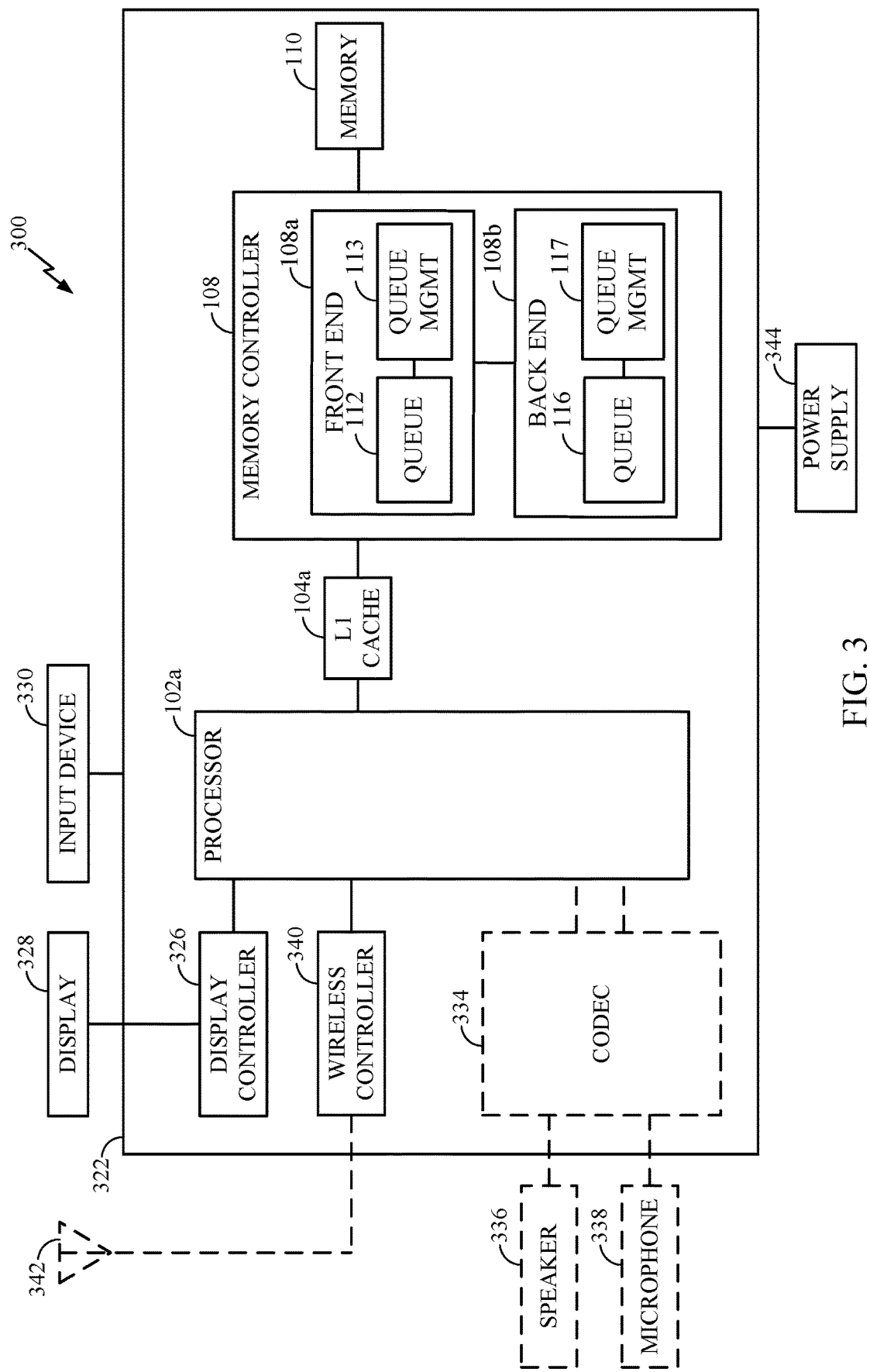
FIG. 3 depicts an exemplary computing device in which an aspect of the disclosure may be advantageously employed.

An example apparatus in which exemplary aspects of this disclosure may be utilized, will now be discussed in relation to FIG. 3. FIG. 3 shows a block diagram of computing device 300. Computing device 300 may correspond to an implementation of processing system 100 shown in FIG. 1 and configured to perform method 200 of FIG. 2. In the depiction of FIG. 3, computing device 300 is shown to include processor 102a, L1 cache 104a, memory controller 108 (showing frontend 108a with read/write queues 112 and queue management block 113 and backend 108b with read/write queues 116 and queue management block 117), and memory 110 of FIG. 1. Various other configurations are possible, and some details of the components discussed with reference to FIG. 1 may have been omitted from FIG. 3, for the sake of clarity. In FIG. 3, processor 102a is exemplarily shown to be coupled to memory 110 with a single-level cache, L1 cache 104a, but it will be understood that other memory configurations known in the art may also be supported by computing device 300.

FIG. 3 also shows display controller 326 that is coupled to processor 102a and to display 328. In some cases, computing device 300 may be used for wireless communication and FIG. 3 also shows optional blocks in dashed lines, such as coder/decoder (CODEC) 334 (e.g., an audio and/or voice CODEC) coupled to processor 102a and speaker 336 and microphone 338 can be coupled to CODEC 334; and wireless antenna 342 coupled to wireless controller 340 which is coupled to processor 102a. Where one or more of these optional blocks are present, in a particular aspect, processor 102a, display controller 326, memory 110, and wireless controller 340 are included in a system-in-package or system-on-chip device 322.

Accordingly, a particular aspect, input device 330 and power supply 344 are coupled to the system-on-chip device 322. Moreover, in a particular aspect, as illustrated in FIG. 3, where one or more optional blocks are present, display 328, input device 330, speaker 336, microphone 338, wireless antenna 342, and power supply 344 are external to the system-on-chip device 322. However, each of display 328, input device 330, speaker 336, microphone 338, wireless antenna 342, and power supply 344 can be coupled to a component of the system-on-chip device 322, such as an interface or a controller.

It should be noted that although FIG. 3 generally depicts a computing device, processor 102a and memory 110, may also be integrated into a set top box, a server, a music player, a video player, an entertainment unit, a navigation device, a personal digital assistant (PDA), a fixed location data unit, a computer, a laptop, a tablet, a communications device, a mobile phone, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer readable media embodying a method for managing access to a shared memory. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of managing access to a shared memory, the method comprising: receiving, at a memory controller, a first request to access the shared memory from a first client of one or more clients configured to access the shared memory; prior to servicing the first request for accessing the shared memory, placing the first request in at least a first queue in the memory controller, wherein the first request remains in the first queue until the first request is serviced; assigning a series of timeout values to the first request, based, at least in part on a priority associated with the first client, the timeout values of the series being assigned such that an earlier duration is different from a later duration, the earlier duration being a duration between an immediately earlier timeout value and a current timeout value and the later duration being a duration between the current timeout value and an immediately later timeout value; subsequent to the series of timeout values being assigned, incrementing a timer while the first request remains in the first queue without being serviced; and as the timer traverses each one of the timeout values in the series and the first request remains in the queue, incrementing a criticality level of the first request.

2. The method of claim 1, further comprising granting access to the shared memory, the first request over a second request in the first queue, if the first request has a higher criticality level than the second request.

3. The method of claim 1, wherein all of the timeout values of the series are assigned such that the criticality level of the first request increases at a faster rate as the timer traverses more timeout values.

4. The method of claim 1, wherein all of the timeout values of the series are assigned such that the criticality level of the first request increases at a slower rate as the timer traverses more timeout values.

5. The method of claim 1, wherein the priority associated with the first client is a pre-specified fixed priority.

6. The method of claim 1, wherein the priority associated with the first client is a dynamically modifiable priority.

7. The method of claim 6, wherein the dynamically modifiable priority is based, at least in part on a Quality-of-Service (QoS) class associated with the first client.

8. The method of claim 7 wherein one or more other clients belong to the same QoS class as the first client.

9. The method of claim 1, wherein the first client is a processor or a cache.

10. The method of claim 1, wherein the series of one or more timeout values are further based on an occupancy of the first queue.

11. The method of claim 10, wherein the occupancy of the first queue comprises a number of requests from a same Quality-of-Service (QoS) class as the first request.

12. The method of claim 1, wherein the first queue is at a frontend of the memory controller interfacing the one or more clients.

13. The method of claim 1, wherein the first queue is at a backend of the memory controller interfacing the shared memory.

14. The method of claim 13, further comprising prioritizing requests in the first queue based on a row hits and/or precharged banks state of the shared memory.

15. The method of claim 14, wherein the state comprises row hits, and wherein requests of the first queue directed to a row of the shared memory with an open row buffer are prioritized for servicing.

16. The method of claim 15, comprising limiting the number of consecutive row hits which are prioritized to a pre-specified number.

17. The method of claim 14, wherein the state comprises precharged banks, and wherein requests of the first queue directed to a precharged bank of the shared memory are prioritized for servicing.

18. An apparatus comprising: a memory controller configured to receive a first request to access a shared memory from a first client of one or more clients configured to access the shared memory, the memory controller comprising: at least a first queue configured to hold the first request before the first request is serviced to access the shared memory, wherein the first request remains in the first queue until the first request is serviced; and logic configured to: assign a series of timeout values to the first request, based, at least in part on a priority associated with the first client, the timeout values of the series being assigned such that an earlier duration is different from a later duration, the earlier duration being a duration between an immediately earlier timeout value and a current timeout value and the later duration being a duration between the current timeout value and an immediately later timeout value; subsequent to the series of timeout values being assigned, increment a timer while the first request remains in the first queue without being serviced; and as the timer traverses each one of the timeout values in the series and the first request remains in the queue, increment a criticality level of the first request.

19. The apparatus of claim 18, wherein the memory controller is further configured to grant access to the shared memory, the first request over a second request in the first queue, if the first request has a higher criticality level than the second request.

20. The apparatus of claim 18, wherein all of the timeout values of the series are assigned such that the criticality level of the first request increases at a faster rate as the timer traverses more timeout values.

21. The apparatus of claim 18, wherein all of the timeout values of the series are assigned such that the criticality level of the first request increases at a slower rate as the timer traverses more timeout values.

22. The apparatus of claim 18, wherein the priority associated with the first client is a pre-specified fixed priority or a dynamically modifiable priority, based, at least in part on a Quality-of-Service (QoS) class associated with the first client.

23. The apparatus of claim 18, wherein the first client is a processor or a cache.

24. The apparatus of claim 18, wherein the series of one or more timeout values are further based on an occupancy of the first queue.

25. The apparatus of claim 18, wherein the first queue is at a backend of the memory controller configured the shared memory, and wherein the memory controller is further configured to prioritize requests in the first queue based on a row hits and/or precharged banks state of the shared memory.

26. The apparatus of claim 25, wherein the state comprises row hits, and wherein requests of the first queue directed to a row of the shared memory with an open row buffer are prioritized for servicing.

27. The apparatus of claim 25, wherein the state comprises precharged banks, and wherein requests of the first queue directed to a precharged bank of the shared memory are prioritized for servicing.

28. The apparatus of claim 18, integrated into a device selected from the group consisting of a set top box, a server, a music player, a video player, an entertainment unit, a navigation device, a personal digital assistant (PDA), a fixed location data unit, a computer, a laptop, a tablet, a communications device, and a mobile phone.

29. An apparatus comprising: means for queuing a first request to access a shared memory, before and until the first request is serviced, the first request received from a first client of one or more clients configured to access the shared memory; means for assigning a series of timeout values to the first request, based, at least in part on a priority associated with the first client, the timeout values of the series being assigned such that an earlier duration is different from a later duration, the earlier duration being a duration between an immediately earlier timeout value and a current timeout value and the later duration being a duration between the current timeout value and an immediately later timeout value; means for incrementing a timer while the first request remains in the means for queuing without being serviced, the timer being incremented subsequent to the series of timeout values being assigned; and means for incrementing a criticality level of the first request as the timer traverses each one of the timeout values in the series and the first request remains in the queue.

30. A non-transitory computer readable storage medium comprising code, which, when executed by a processor, causes the processor to perform operations for managing access to a shared memory, the non-transitory computer readable storage medium comprising: code for receiving, at a memory controller, a first request to access the shared memory from a first client of one or more clients configured to access the shared memory; code for placing the first request in at least a first queue in the memory controller, prior to and until servicing the first request for accessing the shared memory; code for assigning a series of timeout values to the first request, based, at least in part on a priority associated with the first client, the timeout values of the series being assigned such that an earlier duration is different from a later duration, the earlier duration being a duration between an immediately earlier timeout value and a current timeout value and the later duration being a duration between the current timeout value and an immediately later timeout value; code for incrementing a timer while the first request remains in the first queue without being serviced, the timer being incremented subsequent to the series of timeout values being assigned; and code for incrementing a criticality level of the first request as the timer traverses each one of the timeout values in the series and the first request remains in the queue.

* * * * *